United States Patent
Zhao (10) Patent No.: US 11,362,951 B2
(45) Date of Patent: Jun. 14, 2022

(54) ROUTING METHOD AND APPARATUS (71) Applicant: Huawei Technologies Co., Ltd., Shenzhen (CN)

(72) Inventor: Ge Zhao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 33 days.

(21) Appl. No.: 16/508,924

(22) Filed: Jul. 11, 2019

(65) Prior Publication Data
US 2019/0334820 A1  Oct. 31, 2019

Related U.S. Application Data (63) Continuation of application No. PCT/CN2017/109374, filed on Nov. 3, 2017.

(30) Foreign Application Priority Data

Jan. 13, 2017 (CN) .......................... 201710024012.1

(51) Int. Cl.
  *H04L 47/12* (2022.01)
  *H04L 45/302* (2022.01)
  *H04L 45/00* (2022.01)

(52) U.S. Cl.
  CPC ............ *H04L 47/12* (2013.01); *H04L 45/306* (2013.01); *H04L 45/70* (2013.01)

(58) Field of Classification Search
  CPC ........ H04L 47/12; H04L 45/306; H04L 45/70
  See application file for complete search history.

(56) References Cited

U.S. PATENT DOCUMENTS 6,483,898 B2 * 11/2002 Lew ...................... H04M 1/247
                                                          379/88.19
9,929,949 B2 *  3/2018 Mahadevan ............ H04L 45/02
                  (Continued)

FOREIGN PATENT DOCUMENTS

CN        102821432 A     12/2012
CN        103036935 A      4/2013
                  (Continued)

OTHER PUBLICATIONS

Foreign Communication From a Counterpart Application, European Application No. 17891216.8, Extended European Search Report dated Nov. 6, 2019, 8 pages.
(Continued)

*Primary Examiner* — Deepa Belur
(74) *Attorney, Agent, or Firm* — Conley Rose, P.C.

(57) ABSTRACT

Embodiments of the present invention provide a routing method and apparatus. A controller receives a path measurement message, determines a path score of each of at least two paths based on a preset rule and the path measurement message. Then the controller determines a routing policy of a first customer-premises equipment based on the path score of each of the at least two paths, and sends the routing policy to the first customer-premises equipment. According to the present invention, path quality of each path can be scored based on the preset rule and the path measurement message obtained after measurement by the first customer-premises equipment; and the routing policy is generated based on path scores and delivered to the first customer-premises equipment, to ensure that customer-premises equipments in an entire network can transmit a data packet sent by a service application more quickly, stably, and securely.

20 Claims, 4 Drawing Sheets

(56) References Cited

U.S. PATENT DOCUMENTS

| | | | |
|---|---|---|---|
| 2002/0150041 A1 | 10/2002 | Reinshmidt et al. | |
| 2008/0101367 A1* | 5/2008 | Weinman | H04L 63/20 370/392 |
| 2010/0027418 A1* | 2/2010 | Rodrig | H04L 41/147 370/235 |
| 2012/0263186 A1* | 10/2012 | Ueno | H04L 45/38 370/401 |
| 2012/0314651 A1* | 12/2012 | Takamura | H04W 76/16 370/328 |
| 2013/0091212 A1 | 4/2013 | Rajakarunanayake | |
| 2013/0244683 A1 | 9/2013 | Fukumasa et al. | |
| 2015/0381459 A1* | 12/2015 | Xiao | H04L 43/0876 370/253 |
| 2016/0100316 A1* | 4/2016 | Mosko | H04W 40/125 370/254 |
| 2016/0139836 A1 | 5/2016 | Nallathambi et al. | |
| 2016/0150464 A1* | 5/2016 | Zhang | H04L 12/6418 370/254 |
| 2016/0294677 A1* | 10/2016 | Kazerani | H04L 45/22 |
| 2016/0380892 A1 | 12/2016 | Mahadevan et al. | |
| 2018/0227420 A1* | 8/2018 | Burg | H04M 3/5238 |

FOREIGN PATENT DOCUMENTS

| | | | | |
|---|---|---|---|---|
| CN | 103222310 A | 7/2013 | | |
| EP | 2582117 A1 | 4/2013 | | |
| WO | WO-2018040046 A1 * | 3/2018 | | H04L 5/00 |

OTHER PUBLICATIONS

Foreign Communication From a Counterpart Application, PCT Application No. PCT/CN2017/109374, English Translation of International Search Report dated Jan. 22, 2018, 2 pages.

Foreign Communication From a Counterpart Application, PCT Application No. PCT/CN2017/109374, English Translation of Written Opinion dated Jan. 22, 2018, 4 pages.

* cited by examiner

ROUTING METHOD AND APPARATUS

CROSS-REFERENCE TO RELATED APPLICATIONS

This application is a continuation of International Application No. PCT/CN2017/109374, filed on Nov. 3, 2017, which claims priority to Chinese Patent Application No. 201710024012.1, filed on Jan. 13, 2017. The disclosures of the aforementioned applications are hereby incorporated by reference in their entireties.

TECHNICAL FIELD

The present invention relates to the field of communications technologies, and in particular, to a routing method and apparatus.

BACKGROUND

A software-defined wide area network (SD-WAN) is a new type of wide area network architecture that can centrally control wide area network traffic on a plurality of paths. The SD-WAN includes a multi-protocol label switching (MPLS) network, the Internet, a virtual private network (VPN) network, a Long Term Evolution (LTE) network of cellular data services, and the like, and is intended to help customers reduce wide area network (WAN) costs and improve wide area network connection flexibility.

Figure 1:
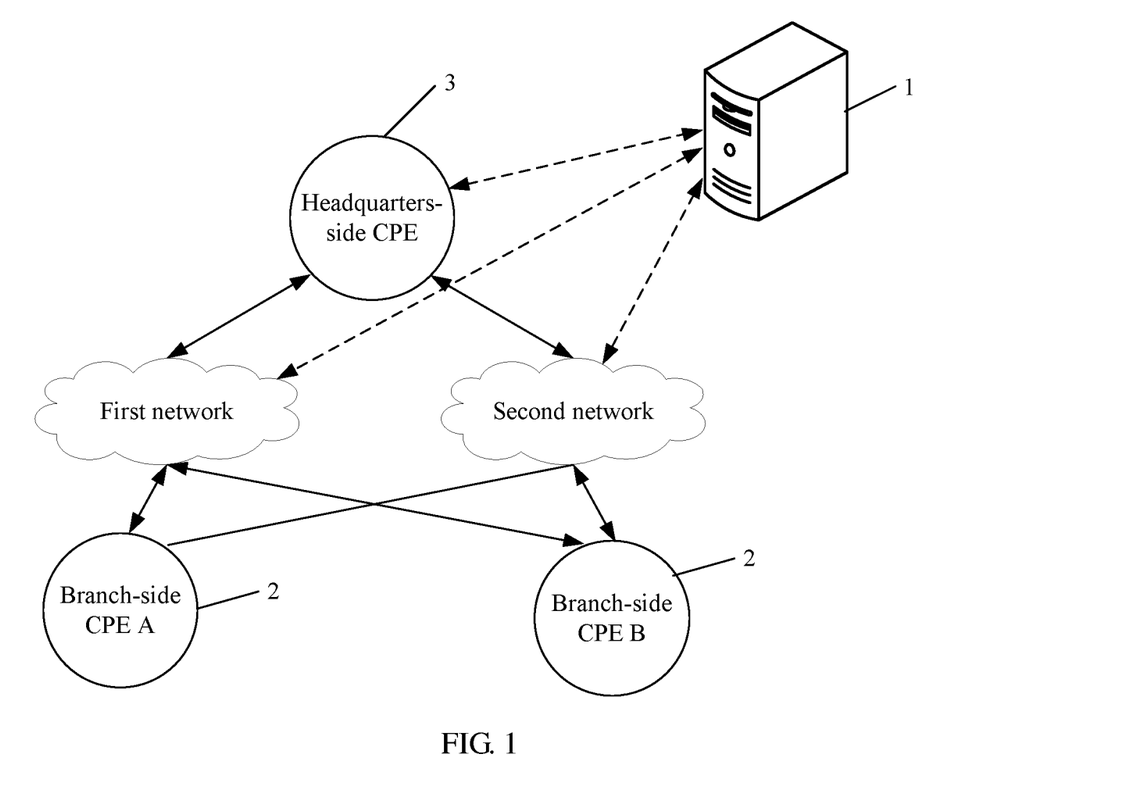
FIG. 1 is a diagram of a network architecture to which a routing method is applied according to an example embodiment.

As shown in FIG. 1, the SD-WAN includes a controller and a plurality of customer-premises equipments (CPE). Serving as an egress of a headquarters network, a headquarters-side CPE (namely, a CPE 3) is connected, by using at least two paths, to each branch-side CPE (namely, a CPE 2) configured in a branch. The at least two paths may be, for example, two paths in FIG. 1 that connect a CPE A and the CPE 3 by using a first network and a second network, respectively. In actual application, the controller 1 delivers a customer-predefined routing policy to the headquarters-side CPE (hereinafter referred to as CPE hub) and a plurality of branch-side CPEs (hereinafter referred to as CPE site) in branches. Each CPE site determines, based on the routing policy, measured path parameters of the at least two paths, and the like, a path over which a data packet of each service application in the branch is transmitted to the CPE hub.

However, after a CPE site in one branch determines, based on a path parameter measured by a branch-side measurement device and the routing policy, a path for transmitting a data packet, a CPE site in another branch may also determine to use the path to transmit a data packet. Consequently, many branches use the same path to transmit data packets to the headquarters, and the path becomes busy and congested, affecting data packet transmission of service applications in the plurality of branches.

SUMMARY

Embodiments of the present invention provide a routing method and apparatus, to resolve a prior-art problem that a path becomes busy and congested when a plurality of branches simultaneously use the path to transmit data packets to headquarters.

To resolve the foregoing technical problem, the embodiments of the present invention disclose the following technical solutions.

A first aspect of the embodiments of the present invention provides a routing method, including: receiving, by a controller, a path measurement message, where the path measurement message includes path measurement results of at least two paths between a first customer-premises equipment and a second customer-premises equipment; determining, by the controller, a path score of each of the at least two paths based on a preset rule and the path measurement results in the path measurement message; determining, by the controller, a routing policy of the first customer-premises equipment based on the path score of each of the at least two paths; and sending, by the controller, the routing policy to the first customer-premises equipment, so that the first customer-premises equipment selects, from the at least two paths according to the routing policy, a path for transmitting a data packet.

With reference to the first aspect, in a first possible implementation of the first aspect, the method further includes: for each of the at least two paths, obtaining, by the controller, historical path scores of the path at least two historical moments before a current time point; predicting a score change trend of the path based on the obtained historical path scores; and determining a future path score of the path at a future moment after the current time point based on the score change trend of the path; and the determining, by the controller, a path score of each of the at least two paths based on a preset rule and the path measurement results includes: for each of the at least two paths, calculating, by the controller, the path score of the path based on a path measurement result, the historical path scores, and the future path score of the path and according to the preset rule.

With reference to the first aspect, in a second possible implementation of the first aspect, the path measurement result includes at least one of path traffic, a path jitter rate, a path delay, a path packet loss rate, or path switching frequency.

With reference to the first aspect, in a third possible implementation of the first aspect, the method further includes: sending, by the controller, a measurement notification message to the first customer-premises equipment, where the measurement notification message includes at least one of a traffic measurement threshold, a jitter measurement threshold, a delay measurement threshold, a packet loss measurement threshold, or a switching threshold, so that the first customer-premises equipment measures each of the at least two corresponding paths to obtain a path measurement result of each path.

With reference to the first aspect, in a fourth possible implementation of the first aspect, an original routing policy of the first customer-premises equipment includes at least one service application, and a priority, a primary path, and a secondary path that are corresponding to each of the at least one service application; and the determining, by the controller, a routing policy of the first customer-premises equipment based on the path score of each of the at least two paths includes: determining, by the controller, a service application whose priority is higher than a preset priority in the at least one service application, as a target application, where a primary path corresponding to the target application is a first path; determining, by the controller, a path score of the first path; and when the path score of the first path is less than a second threshold, changing, by the controller, the primary path corresponding to the target application from the first path to any path whose path score is greater than a first threshold, to obtain a new routing policy of the first customer-premises equipment.

A second aspect of the embodiments of the present invention provides a routing method, where the method includes: measuring, by a first customer-premises equipment, each of at least two paths between the first customer-premises equipment and a second customer-premises equipment, to obtain a path measurement result of each path; when a path measurement result of any of the at least two paths meets a preset condition, generating, by the first customer-premises equipment, a path measurement message based on the path measurement result of each path, where the path measurement message carries the path measurement result of each path; sending, by the first customer-premises equipment, the path measurement message to a controller; and receiving, by the first customer-premises equipment, a routing policy sent by the controller in response to the path measurement message, and selecting, from the at least two paths according to the routing policy, a path for transmitting a data packet of each service application.

With reference to the second aspect, in a first possible implementation of the second aspect, the path measurement result includes at least one of path traffic, a path jitter rate, a path delay, a path packet loss rate, or path switching frequency.

With reference to the second aspect, in a second possible implementation of the second aspect, the method further includes receiving a measurement notification message which includes a traffic measurement threshold, a jitter measurement threshold, a delay measurement threshold, a packet loss measurement threshold, and/or a switching threshold; and the method further includes: in any path measurement result, if path traffic exceeds the traffic measurement threshold, a jitter rate exceeds the jitter measurement threshold, a delay exceeds the delay measurement threshold, a packet loss rate exceeds the packet loss measurement threshold, or switching frequency exceeds the switching threshold, determining that the path measurement result meets the preset condition.

A third aspect of the embodiments of the present invention provides a routing apparatus, including a receiving module, a determining module, and a sending module.

The receiving module is configured to receive a path measurement message, where the path measurement message includes path measurement results of at least two paths between a first customer-premises equipment and a second customer-premises equipment; the determining module is configured to determine a path score of each of the at least two paths based on a preset rule and the path measurement results; the determining module is further configured to determine a routing policy of the first customer-premises equipment based on the path score of each of the at least two paths; and the sending module is configured to send the routing policy to the first customer-premises equipment, so that the first customer-premises equipment selects, from the at least two paths according to the routing policy, a path for transmitting a data packet.

The routing apparatus can implement the method in the first aspect and the implementations of the first aspect.

A fourth aspect of the embodiments of the present invention provides a routing apparatus, where the apparatus is a first customer-premises equipment and includes: a measurement module, configured to measure each of at least two paths between the first customer-premises equipment and a second customer-premises equipment, to obtain a path measurement result of each path; a generation module, configured to: when a path measurement result of any of the at least two paths meets a preset condition, generate a path measurement message based on the path measurement result of each path, where the path measurement message carries the path measurement result of each path; a sending module, configured to send the path measurement message to a controller; and a receiving module, configured to: receive a routing policy sent by the controller in response to the path measurement message; and select, from the at least two paths according to the routing policy, a path for transmitting a data packet of each service application.

The routing apparatus can implement the method in the second aspect and the implementations of the second aspect.

A fifth aspect of the embodiments of the present invention provides a routing apparatus, including a processor and a memory. The processor and the memory are configured to support the routing apparatus in implementing corresponding functions in the method in the first aspect or the second aspect. The memory stores a program, and the processor is configured to invoke the program to implement the method in the first or second aspect and the implementations of the first or second aspect.

A sixth aspect of the embodiments of the present invention provides a computer readable medium, configured to store a computer program, and the computer program includes an instruction used to execute the method in the first or second aspect and the implementations of the first or second aspect.

The technical solutions provided in the embodiments of the present invention may have the following beneficial effects:

In the embodiments of the present invention, after receiving the path measurement message, the controller may first determine, based on the preset rule and the received path measurement results, path scores of the at least two paths corresponding to the first customer-premises equipment; then, determine the routing policy of the first customer-premises equipment based on the path score of each of the at least two paths; and finally send the routing policy to the first customer-premises equipment, so that the first customer-premises equipment selects, from the at least two paths according to the routing policy, the path for transmitting a data packet.

According to the methods provided in the embodiments of the present invention, path quality of each path can be scored in response to the path measurement message obtained after the first customer-premises equipment measures each of the at least two paths between the first customer-premises equipment and the second customer-premises equipment and according to the preset rule; the routing policy suitable for a current network-wide path status is automatically generated based on the path scores; and the generated routing policy is automatically delivered to the first customer-premises equipment and the second customer-premises equipment, to ensure that the customer-premises equipments in an entire network can transmit a data packet sent by a service application more quickly, stably, and securely. This improves data packet transmission quality.

It should be understood that, the foregoing general description and the following detailed description are merely illustrative and explanatory, and are not intended to limit the present invention.

DESCRIPTION OF EMBODIMENTS

To make a person skilled in the art understand the technical solutions in the present invention better, the following describes the technical solutions in the embodiments of the present invention with reference to the accompanying drawings in the embodiments of the present invention.

Figure 2:
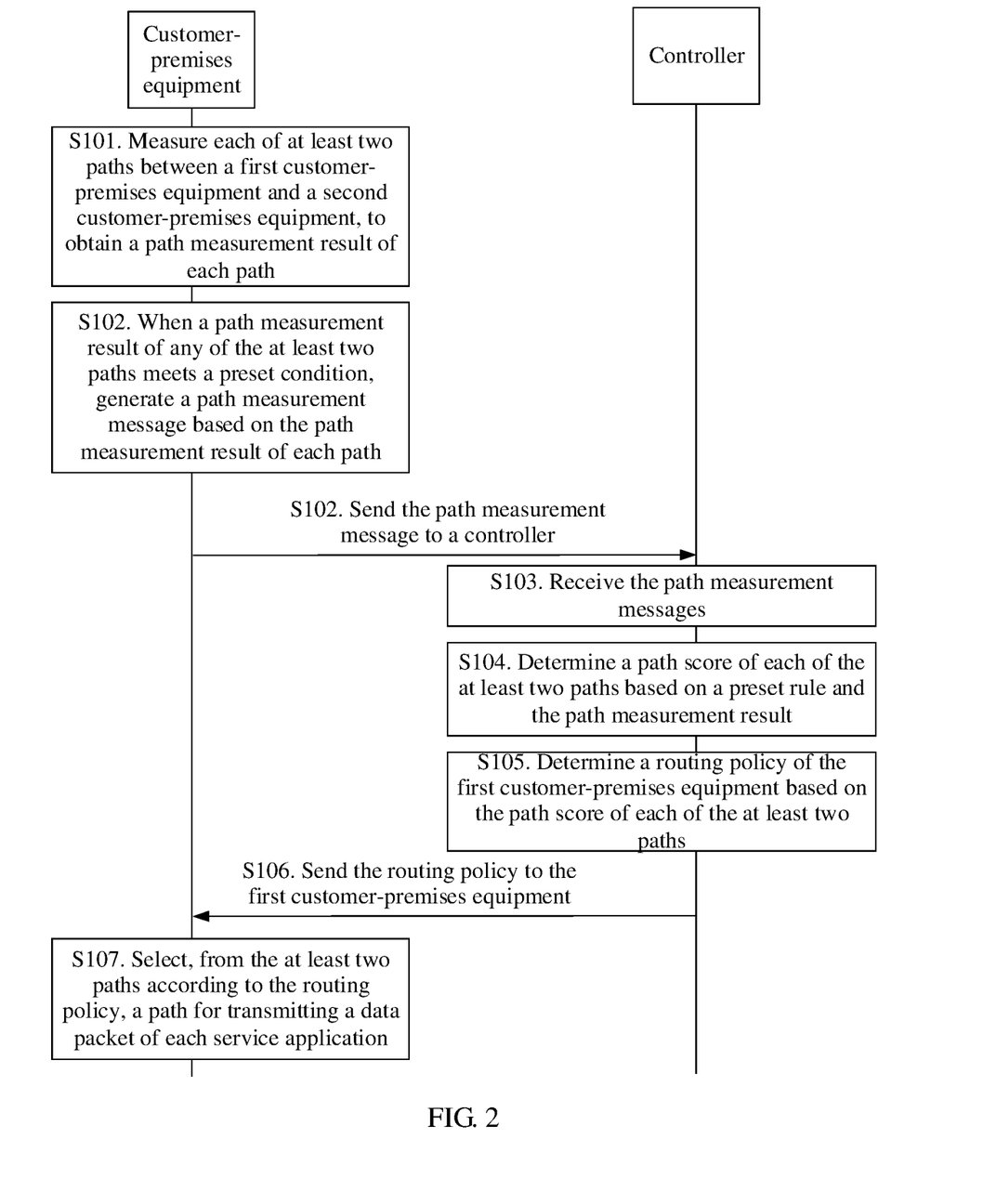
FIG. 2 is a schematic flowchart of a routing method according to an example embodiment.

During transmission of a data packet in a branch, to select an appropriate path for the data packet based on path quality of an entire network, as shown in FIG. 2, an embodiment of the present invention provides a routing method. The routing method may be applied to a controller 1 in FIG. 1. In actual application, the controller 1 is mainly responsible for generating a routing policy based on a path parameter, and delivering the routing policy to a branch-side CPE 2 and a headquarters-side CPE 3. FIG. 1 also includes the branch-side CPE 2 and the headquarters-side CPE 3. The branch-side CPE 2 measures at least two paths connecting the branch-side CPE 2 and the headquarters-side CPE 3, adds measured path measurement results to a path measurement message, and reports the path measurement message to the controller 1. The headquarters-side CPE 3 measures path parameters of at least two paths connecting the headquarters-side CPE 3 and the branch-side CPE 2, and reports the measured path parameters to the controller 1 in a form of a path measurement message. In this embodiment of the present invention, the path is a path between the headquarters-side CPE 3 and the branch-side CPE 2. As shown in FIG. 1, the headquarters-side CPE 3 and a branch-side CPE A communicate by using a path passing through a first network, or communicate by using a path passing through a second network; and the headquarters-side CPE 3 and a branch-side CPE B also communicate by using a path passing through the first network, or communicate by using a path passing through the second network. In other words, each branch-side CPE 2 communicates with the headquarters-side CPE 3 by using at least two paths. The routing method includes the following steps.

Step S101. A first customer-premises equipment measures each of at least two paths between the first customer-premises equipment and a second customer-premises equipment, to obtain a path measurement result of each path.

In this embodiment of the present invention, the first customer-premises equipment may be the headquarters-side CPE or the branch-side CPE; a customer is generally an enterprise user; the at least two paths corresponding to the first customer-premises equipment may be the at least two paths by using which the headquarters-side CPE is connected to the branch-side CPE, or the at least two paths by using which the branch-side CPE is connected to the headquarters-side CPE; a path measurement message carries path measurement results of the at least two paths corresponding to the first customer-premises equipment; and the path measurement result includes at least one of path traffic (namely, a quantity of packets transmitted per second on the path), a path jitter rate (namely, a quantity of jitters per second on the path), a path delay (namely, time required for transmitting a packet from one end of the path to the other end of the path), a path packet loss rate (namely, a quantity of packets lost per second on the path), and path switching frequency (namely, a quantity of times of path switching per second).

In this step, the first customer-premises equipment measures at least one of the path traffic, the jitter parameter, the delay, the packet loss rate, and the switching frequency of each of the at least two paths by using which the first customer-premises equipment is connected to the second customer-premises equipment, and generates, based on the measured path measurement result of each path, the path measurement message including the path measurement results of the plurality of paths.

Optionally, when an active measurement function is not configured in each customer-premises equipment, path measurement may be initiated in a passive manner based on a measurement notification message sent by the controller. Therefore, before step S101, the method may further include: receiving, by the first customer-premises equipment, the measurement notification message sent by the controller, and measuring each of the at least two paths based on the measurement notification message, to obtain the measurement result of each path.

Step S102. When a path measurement result of any of the at least two paths meets a preset condition, the first customer-premises equipment generates a path measurement message based on the path measurement result of each path, where the path measurement message carries the path measurement result of each path; and the first customer-premises equipment sends the path measurement message to the controller.

In this embodiment of the present invention, to help the first customer-premises equipment determine whether the path traffic, the jitter rate, the delay, the packet loss rate, or the switching frequency of each path exceeds a corresponding threshold, and therefore to facilitate determining whether the path measurement result meets the preset condition, the measurement notification message includes at least one of a traffic measurement threshold, a jitter measurement threshold, a delay measurement threshold, a packet loss measurement threshold, and a switching threshold.

In this step, the first customer-premises equipment may first compare the measured path traffic with the traffic measurement threshold, compare the jitter parameter with the jitter measurement threshold, compare the delay with the delay measurement threshold, compare the packet loss rate with the packet loss measurement threshold, or compare the switching frequency with the switching threshold. In any path measurement result, if path traffic exceeds the traffic measurement threshold, a jitter rate exceeds the jitter measurement threshold, a delay exceeds the delay measurement threshold, a packet loss rate exceeds the packet loss measurement threshold, or switching frequency exceeds the switching threshold, the path measurement result meets the preset condition. In this embodiment of the present invention, the branch-side CPE may directly send the path measurement message to the controller, and the headquarters-side CPE may also directly send the path measurement message to the controller.

Step S103. The controller receives the path measurement message.

In this embodiment of the present invention, the path measurement message includes the path measurement results of the at least two paths between the first customer-premises equipment and the second customer-premises equipment.

In this step, the controller may receive path measurement messages sent by a plurality of customer-premises equipments, that is, path measurement messages sent by the headquarters-side CPE and a plurality of branch-side CPEs.

Step S104. The controller determines a path score of each of the at least two paths based on a preset rule and the path measurement result.

In this embodiment of the present invention, the preset rule may be represented by the following formula:

$$LinkM = F(\text{traffic})*\text{weight\_traffic} + F(\text{jitter})*\text{weight\_}j + F(\text{delay})*\text{weight\_}d + F(\text{loss})*\text{weight\_}L + F(\text{LinkSwitch})*\text{weight\_switch} + HisLinkM*\text{weight\_}h + FutureLinkM*\text{weight\_}f \quad (1)$$

In the preceding formula, LinkM indicates a path score of any path; traffic indicates path traffic; weight_traffic indicates a weight of the path traffic; jitter indicates a jitter rate of the path; weight_j indicates a weight of the jitter rate; delay indicates a delay; weight_d indicates a weight of the delay; loss indicates a packet loss rate; weight_L indicates a weight of the packet loss rate; LinkSwitch indicates switching frequency; weight_switch indicates a weight of the switching frequency; HisLinkM indicates a historical path score of the path at a moment the same as the current time point on a previous day; for example, if the current time point is 8:00 a.m. on December 10, the moment the same as the current time point on the previous day may be 8:00 a.m. on December 9, 8:00 a.m. on December 8, 8:00 a.m. on December 7, or the like; weight_h indicates a weight of the historical path score; FutureLinkM indicates a future path score at a future moment the same as the current time point on a future day; for example, if the current time point is 10:00 p.m. on December 10, the moment the same as the current time point on the future day may be 10:00 p.m. on December 11; and weight_f indicates a weight of the future path score. An F(x) function may be used to calculate scores of the parameters in the formula (1) based on input values of the parameters. The parameter herein may be traffic, jitter, delay, loss, LinkSwitch, HisLinkM, or FutureLinkM. The F(x) function is not limited in the present invention, and an appropriate algorithm may be determined based on an actual situation. The following is an example of the F(x) function:

if $x \le BT$ $F(x)=100$;

if $BT < x \le VT$ $F(x) = 60 + 40*(VT-X)/(VT-BT)$;

if $VT < X \le IT$ $F(x) = 60 - 60*(X-VT)/VT$; and if $X > IT$ $F(x)=0$, where

VT is a minimum threshold, IT may be an acceptable worst threshold, BT is a maximum threshold, and VT<IT<BT.

Based on the foregoing formula, the method may further include the following steps:

For each customer-premises equipment, the controller obtains historical path scores of each of at least two paths at at least two historical moments before a current time point, or in other words, the controller may determine HisLinkM for the at least two paths corresponding to each customer-premises equipment.

For each path, the controller predicts a score change trend of the path based on the obtained historical path scores, and determines a future path score of the path at a future moment after the current time point based on the score change trend, or in other words, the controller may determine FutureLinkM for the at least two paths corresponding to each customer-premises equipment.

In this step, the controller calculates the path score of each path based on the path measurement result, the historical path scores, and the future path score of the path and according to the preset rule.

In actual application, referring to the following correspondence table 1, an original routing policy of each customer-premises equipment includes at least one service application, and a priority, a primary path, and a secondary path that are corresponding to each of the at least one service application.

| Service application | Priority | Primary path | Secondary path |
| --- | --- | --- | --- |
| VoIP | High | MPLS path | Internet path |
| Email | Medium | Internet path | MPLS path |

In actual application, if a routing policy in customer-premises equipment is to be replaced for a first time, an original routing policy may be a routing policy preconfigured by a customer in the customer-premises equipment. If a routing policy in customer-premises equipment is not to be replaced for a first time, an original routing policy may be a routing policy delivered by the controller last time. A replacement identifier may be set to help determine whether the routing policy in the customer-premises equipment is to be replaced for the first time. For example, when the replacement identifier is 0, the routing policy has not been replaced, and is a customer-preconfigured routing policy; when the replacement identifier is 1, the routing policy has been replaced. The primary path is a path used preferentially, and the secondary path is a candidate path. A priority of a service application may be a priority of using a path by the service application. For example, the priority of using the multi-protocol label switching virtual private network (MPLS VPN) path by the service application Email is medium, and the priority of using the MPLS VPN path by the service application Voice over Internet Protocol (VoIP) is high.

Step S105. The controller determines a routing policy of the first customer-premises equipment based on the path score of each of the at least two paths.

Figure 3:
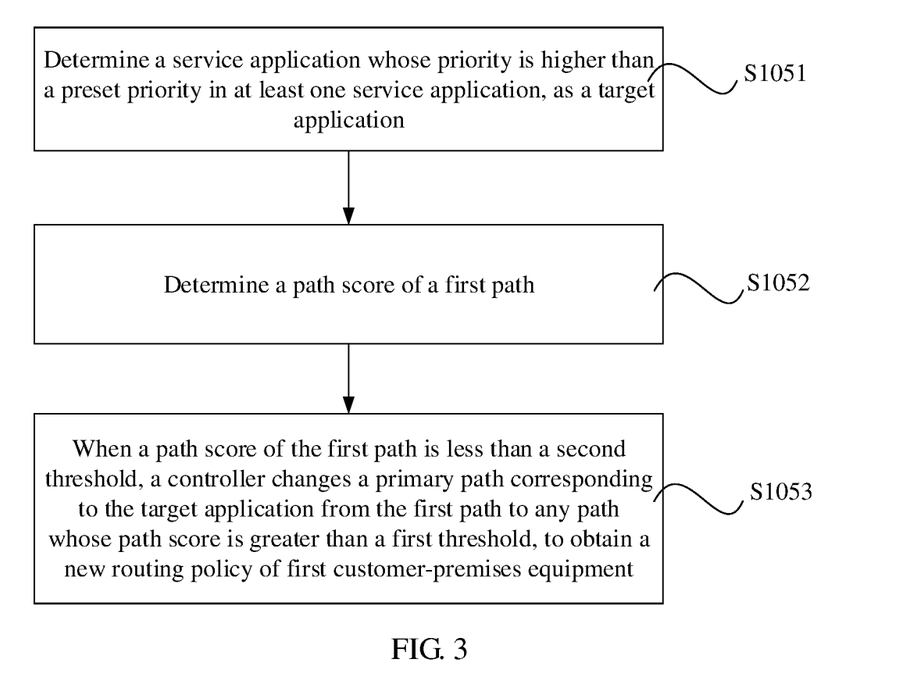
FIG. 3 is a schematic flowchart of step S105 in FIG. 2.

In actual application, step S105 may include the following steps.

Step S1051. The controller determines a service application whose priority is higher than a preset priority in the at least one service application, as a target application, where a primary path corresponding to the target application is a first path.

In this embodiment of the present invention, the preset priority may be a high priority, a medium-or-high priority, or the like, and may be specifically set based on an actual need. This is not limited in this embodiment of the present invention.

Step S1052. The controller determines a path score of the first path.

Specifically, the controller has determined the path score of each path, and therefore can determine the score of the first path easily after determining the first path.

Step S1053. When the path score of the first path is less than a second threshold, the controller changes the primary path corresponding to the target application from the first path to any path whose path score is greater than a first threshold, to obtain a new routing policy of the first customer-premises equipment.

In this embodiment of the present invention, the first threshold and the second threshold may each be a preset value, for example, 1, 2 or 3. In this embodiment of the present invention, the first threshold is greater than the second threshold, and specific values may be set based on an actual need.

A path whose path score is greater than the first threshold is a path of relatively good path quality, and a path whose path score is less than the second threshold is a path of relatively poor path quality.

In this step, the controller replaces a primary path, corresponding to each target application, of relatively poor path quality in the original routing policy with a path whose path score is greater than the first threshold, or in other words, changes the primary path from the path with a low path score to the path with a high path score, to obtain the new routing policy, so as to ensure more reliable transmission of a data packet.

In actual application, optionally, the routing method may further include: determining, by the controller, path scores of primary paths of a plurality of service applications in the original routing policy.

In this step, the controller may determine, based on the original routing policy of each customer-premises equipment, the primary path corresponding to each service application, and then determine, based on path scores of the at least two paths of the customer-premises equipment, a primary path A of each service application. Because the path scores of the at least two paths of the customer-premises equipment certainly include a path score X of the path A, a path score of the primary path of the service application A is X.

If the path scores of the primary paths of the plurality of service applications are greater than a third threshold, and the current routing policy is not the routing policy preconfigured by the customer in the customer-premises equipment, the controller sends a rollback instruction to the at least one customer-premises equipment in which the path scores are greater than the third threshold, so that the routing policy of the at least one customer-premises equipment is rolled back to the preconfigured routing policy.

In this embodiment of the present invention, the plurality of service applications for which the path scores of the primary paths are greater than the third threshold may be all the service applications in the original routing policy, or the like. The third threshold should be greater than the first threshold, and the third threshold may be a preset value, for example, 1, 2 or 3. A specific value may be set based on an actual need.

In this step, the controller may compare the path score of the primary path of each service application with the third threshold. When scores of a plurality of primary paths are greater than the third threshold, the primary paths whose path scores are greater than the third threshold have relatively good path quality. In actual application, in the preconfigured routing policy, a primary path is generally a path of relatively good path quality, and a secondary path is a path whose path quality is poorer than that of the primary path. Therefore, the rollback instruction may be used to instruct the customer-premises equipment to roll back from the current routing policy to the preconfigured routing policy, and the customer-premises equipment transmits a data packet according to the preconfigured routing policy without generating a new routing policy.

Step S106. The controller sends the routing policy to the first customer-premises equipment.

In actual application, the controller may further store the determined routing policy before or after sending the routing policy, so that the controller knows a current routing policy of each customer-premises equipment.

Step S107. The first customer-premises equipment selects, from the at least two paths according to the routing policy, a path for transmitting a data packet of each service application.

In this step, after receiving the routing policy sent by the controller, the first customer-premises equipment may determine, according to the routing policy, the path for transmitting a data packet sent by each service application.

In actual application, before step S102, the routing method may further include: determining, by the controller, the path scores of the primary paths of the plurality of service applications in the original routing policy; and if a path measurement result of a primary path of at least one service application meets an automatic switching condition, changing, by the customer-premises equipment, the primary path of the at least one service application to secondary path, and changing the secondary path to primary path.

In this embodiment of the present invention, the automatic switching condition may be that path traffic on a primary path, a jitter rate of a delay jitter on the path, a delay of the path, and a packet loss rate of packet loss on the path and/or a switching parameter of path switching frequency are/is less than a minimum path quality threshold preconfigured by the customer. In this case, before sending the path measurement message to the controller, the customer-premises equipment may further automatically change the primary path to secondary path, and change the secondary path to primary path.

In this embodiment of the present invention, after receiving the path measurement message, the controller may first determine, based on the preset rule and the received path measurement results, the path scores of the at least two paths corresponding to the first customer-premises equipment; then, determine the routing policy of the first customer-premises equipment based on the path score of each of the at least two paths; and finally send the routing policy to the first customer-premises equipment, so that the first customer-premises equipment selects, from the at least two paths according to the routing policy, the path for transmitting a data packet.

According to the method provided in this embodiment of the present invention, path quality of each path can be scored based on the path measurement message obtained after the first customer-premises equipment measures each of the at least two paths between the first customer-premises equipment and the second customer-premises equipment and according to the preset rule; the routing policy suitable for a current network-wide path status is automatically generated based on the path scores; and the generated routing policy is automatically delivered to the first customer-premises equipment and the second customer-premises equipment, to ensure that the customer-premises equipments in an entire network can transmit a data packet sent by a service application more quickly, stably, and securely. This improves data packet transmission quality.

Figure 4:
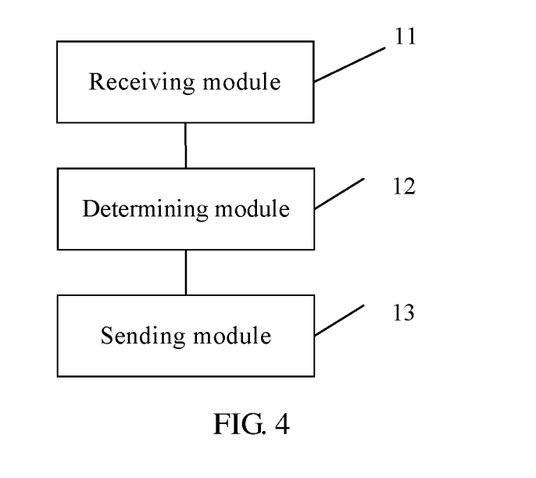
FIG. 4 is a schematic structural diagram of a routing apparatus according to an example embodiment.

As shown in FIG. 4, in another embodiment of the present invention, a routing apparatus is provided, including a receiving module 11, a determining module 12, and a sending module 13.

The receiving module 11 is configured to receive a path measurement message, where the path measurement message includes path measurement results of at least two paths between a first customer-premises equipment and a second customer-premises equipment.

The determining module 12 is configured to determine a path score of each of the at least two paths based on a preset rule and the path measurement results.

The determining module 12 is further configured to determine a routing policy of the first customer-premises equipment based on the path score of each of the at least two paths.

The sending module 13 is configured to send the routing policy to the first customer-premises equipment, so that the first customer-premises equipment selects, from the at least two paths according to the routing policy, a path for transmitting a data packet.

In another embodiment of the present invention, the determining module 12 is further configured to: for each of the at least two paths, obtain historical path scores of the path at least two historical moments before a current time point; predict a score change trend of the path based on the obtained historical path scores; and determine a future path score of the path at a future moment after the current time point based on the score change trend of the path; and the determining module 12 is further configured to: for each of the at least two paths, calculate the path score of the path based on a path measurement result, the historical path scores, and the future path score of the path and according to the preset rule.

In another embodiment of the present invention, the path measurement result includes at least one of path traffic, a path jitter rate, a path delay, a path packet loss rate, and path switching frequency.

In another embodiment of the present invention, the sending module 13 is further configured to send a measurement notification message to the first customer-premises equipment, where the measurement notification message includes at least one of a traffic measurement threshold, a jitter measurement threshold, a delay measurement threshold, a packet loss measurement threshold, and a switching threshold, so that the first customer-premises equipment measures each of the at least two corresponding paths to obtain a path measurement result of each path.

In another embodiment of the present invention, an original routing policy of the first customer-premises equipment includes at least one service application, and a priority, a primary path, and a secondary path that are corresponding to each of the at least one service application; and the determining module 12 is configured to: determine a service application whose priority is higher than a preset priority in the at least one service application, as a target application, where a primary path corresponding to the target application is a first path; determine a path score of the first path; and when the path score of the first path is less than a second threshold, change the primary path corresponding to the target application from the first path to any path whose path score is greater than a first threshold, to obtain a new routing policy of the first customer-premises equipment.

Figure 5:
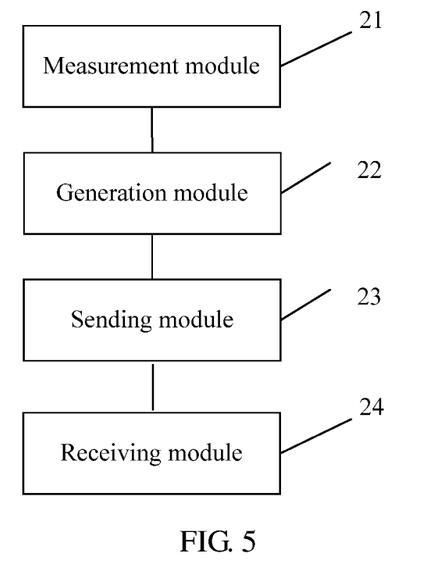
FIG. 5 is a schematic structural diagram of another routing apparatus according to an example embodiment.

As shown in FIG. 5, in still another embodiment of the present invention, a routing apparatus is provided, including a measurement module 21, a generation module 22, a sending module 23, and a receiving module 24.

The measurement module 21 is configured to measure each of at least two paths between the first customer-premises equipment and a second customer-premises equipment, to obtain a path measurement result of each path.

The generation module 22 is configured to: when a path measurement result of any of the at least two paths meets a preset condition, generate a path measurement message based on the path measurement result of each path, where the path measurement message carries the path measurement result of each path.

The sending module 23 is configured to send the path measurement message to a controller.

The receiving module 24 is configured to: receive a routing policy sent by the controller based on the path measurement message; and select, from the at least two paths according to the routing policy, a path for transmitting a data packet of each service application.

In still another embodiment of the present invention, the path measurement result includes at least one of path traffic, a path jitter rate, a path delay, a path packet loss rate, and path switching frequency.

In still another embodiment of the present invention, the measurement notification message includes a traffic measurement threshold, a jitter measurement threshold, a delay measurement threshold, a packet loss measurement threshold, and/or a switching threshold; and the apparatus further includes: a determining module, configured to: in any path measurement result, if path traffic exceeds the traffic measurement threshold, a jitter rate exceeds the jitter measurement threshold, a delay exceeds the delay measurement threshold, a packet loss rate exceeds the packet loss measurement threshold, or switching frequency exceeds the switching threshold, determine that the path measurement result meets the preset condition.

Figure 6:
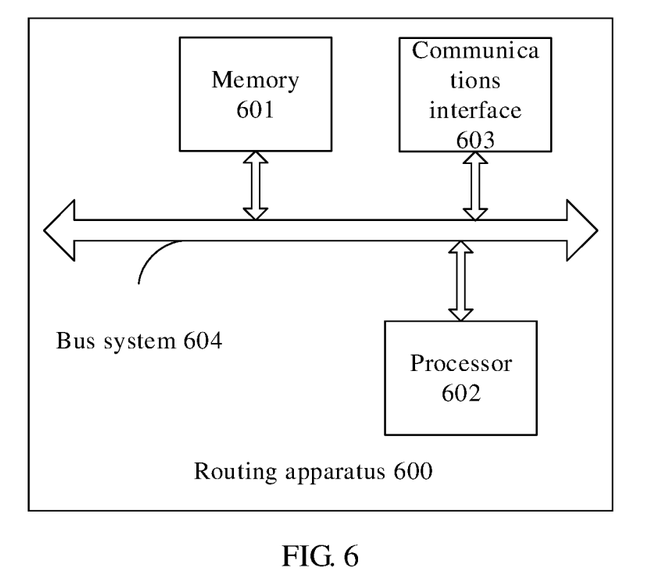
FIG. 6 is a schematic structural diagram of still another routing apparatus according to an embodiment of the present invention.

An embodiment of the present invention provides a routing apparatus 600, as shown in FIG. 6, including a memory 601, a processor 602, and a communications interface 603. The memory 601 is configured to store code or a program, the processor 602 is configured to invoke the code or the program to execute any of the methods shown in FIG. 2 and FIG. 3, and the communications interface 603 is configured to communicate with another device.

The memory 601, the processor 602 and the communications interface 603 are coupled together by using a bus system 604. The memory 601 may include a random access memory, or may further include a non-volatile memory, such as at least one magnetic disk storage. The bus system 604 may be an Industry Standard Architecture (ISA) bus, a Peripheral Component Interconnect (PCI) bus, an Extended Industry Standard Architecture (EISA) bus, or the like. The bus system 604 may be classified into an address bus, a data bus, a control bus, and the like. For ease of representation, the bus is represented by using only one bold line in FIG. 6. However, this does not mean that there is only one bus or one type of bus.

In an implementation, the receiving module and the sending module in FIG. 4 or FIG. 5 may be integrated into the communications interface 603, and the remaining modules may be integrated into the processor 602. The remaining modules may be built in or be independent of the processor of the routing apparatus 600 in a hardware form, or may be stored in a software form in the memory of the routing apparatus 600, for the processor to invoke to perform operations corresponding to the foregoing modules. The processor may be a central processing unit (CPU), an application-specific integrated circuit (ASIC), or one or more integrated circuits configured to implement this embodiment of the present invention.

The devices in the routing apparatus 600 provided in this embodiment of the present invention are configured to execute the foregoing method. Therefore, for beneficial effects of the routing apparatus 600, refer to the beneficial effects of the foregoing method. Details are not repeated herein.

During specific implementation, the present invention further provides a computer storage medium. The computer storage medium may store a program. When the program is executed, some or all of the steps of the embodiments of the routing method provided in the present invention may be performed. The storage medium may be a magnetic disk, an optical disc, a read-only memory (ROM), a random access memory (RAM), or the like.

For same or similar parts in the embodiments in this specification, mutual reference may be made between these embodiments. Especially, wireless communications device embodiments are basically similar to a method embodiment, and therefore are described briefly. For related parts, refer to descriptions in the method embodiment.

The foregoing implementations of the present invention are not intended to limit the protection scope of the present invention.

What is claimed is:

1. A routing method, comprising:
receiving, by a controller from a first customer-premises equipment, a path measurement message, wherein the path measurement message comprises path measurement results of a plurality of distinct paths between the first customer-premises equipment and a second customer-premises equipment;
determining, by the controller, a path score of each of the distinct paths based on a preset rule and the path measurement results;
determining, by the controller, a routing policy of the first customer-premises equipment based on the path score of each of the distinct paths; and
sending, by the controller, the routing policy to the first customer-premises equipment.

2. The method of claim 1, further comprising:
obtaining, by the controller, historical path scores for each of the distinct paths at two or more historical moments before a current time point;
predicting a score change trend for each of the distinct paths based on obtaining the historical path scores; and
determining a future path score for each of the distinct paths at a future moment after the current time point based on the score change trend of a corresponding path, wherein determining the path score of the distinct paths comprises calculating the path score of each path based on a corresponding path measurement result, the historical path scores, the future path score of the corresponding path, and the preset rule.

3. The method of claim 1, wherein the path measurement results comprise at least one of path traffic, a path jitter rate, a path delay, a path packet loss rate, or path switching frequency.

4. The method of claim 3, further comprising sending, by the controller, a measurement notification message to the first customer-premises equipment, wherein the measurement notification message comprises at least one of a traffic measurement threshold, a jitter measurement threshold, a delay measurement threshold, a packet loss measurement threshold, or a switching threshold.

5. The method of claim 1, wherein an original routing policy of the first customer-premises equipment comprises at least one service application, and a priority, a primary path, and a secondary path that are corresponding to each of the at least one service application, and determining, by the controller, the routing policy of the first customer-premises equipment based on the path score of each of the distinct paths comprises:
determining, by the controller, a service application whose priority is higher than a preset priority in the at least one service application, as a target application, wherein a primary path corresponding to the target application is a first path;
determining, by the controller, a path score of the first path; and
when the path score of the first path is less than a second threshold, changing, by the controller, the primary path corresponding to the target application from the first path to any path whose path score is greater than a first threshold, to obtain a new routing policy of the first customer-premises equipment.

6. The method of claim 4, wherein an original routing policy of the first customer-premises equipment comprises at least one service application, and a priority, a primary path, and a secondary path that are corresponding to each of the at least one service application, and determining, by the controller, the routing policy of the first customer-premises equipment based on the path score of each of the distinct paths comprises:
determining, by the controller, a service application whose priority is higher than a preset priority in the at least one service application, as a target application, wherein a primary path corresponding to the target application is a first path;
determining, by the controller, a path score of the first path; and
when the path score of the first path is less than a second threshold, changing, by the controller, the primary path corresponding to the target application from the first path to any path whose path score is greater than a first threshold, to obtain a new routing policy of the first customer-premises equipment.

7. A routing method, comprising:
measuring, by a first customer-premises equipment, a plurality of distinct paths between the first customer-premises equipment and a second customer-premises equipment to obtain a path measurement result of each of the distinct paths;
generating, by the first customer-premises equipment, a path measurement message carrying a path measurement result of each of the distinct paths, wherein the path measurement message is generated responsive to any path measurement result for any of the distinct paths meeting a preset condition;
sending, by the first customer-premises equipment, the path measurement message to a controller;
receiving, by the first customer-premises equipment, a routing policy from the controller in response to the path measurement message; and
selecting a path for transmitting a data packet of each service application from the distinct paths according to the routing policy.

8. The method of claim 7, wherein the path measurement result comprise at least one of path traffic, a path jitter rate, a path delay, a path packet loss rate, or path switching frequency.

9. The method of claim 8, further comprising:
receiving a measurement notification message which comprises at least one of a traffic measurement threshold, a jitter measurement threshold, a delay measurement threshold, a packet loss measurement threshold, and/or or a switching threshold; and
in any path measurement result, responsive to path traffic exceeding the traffic measurement threshold, a jitter rate exceeding the jitter measurement threshold, a delay exceeding the delay measurement threshold, a packet loss rate exceeding the packet loss measurement threshold, or switching frequency exceeding the switching threshold, determining that the path measurement result meets the preset condition.

10. A routing apparatus, comprising:
a memory configured to store a program; and
a processor coupled to the memory and configured to execute the program, the processor further configured to, responsive to executing the program:
receive a path measurement message from a first customer-premises equipment, wherein the path measurement message comprises path measurement results of a plurality of distinct paths between the first customer-premises equipment and a second customer-premises equipment;
determine a path score of each of the distinct paths based on a preset rule and the path measurement results;
determine a routing policy of the first customer-premises equipment based on the path score of each of the distinct paths; and
send the routing policy to the first customer-premises equipment.

11. The routing apparatus of claim 10, wherein, responsive to executing the program, the processor is further configured to:
obtain historical path scores for each of the distinct paths at two or more historical moments before a current time point;
predict a score change trend for each of the distinct paths based on the historical path scores;
determine a future path score for each of the distinct paths at a future moment after the current time point based on the score change trend of a corresponding path; and
calculate the path score of each path based on a corresponding path measurement result, the historical path scores, the future path score of the corresponding path, and the preset rule.

12. The routing apparatus of claim 10, wherein the path measurement results comprise at least one of path traffic, a path jitter rate, a path delay, a path packet loss rate, or path switching frequency.

13. The routing apparatus of claim 12, wherein, responsive to executing the program, the processor is further configured to send a measurement notification message to the first customer-premises equipment, wherein the measurement notification message comprises at least one of a traffic measurement threshold, a jitter measurement threshold, a delay measurement threshold, a packet loss measurement threshold, or a switching threshold.

14. The routing apparatus of claim 10, wherein an original routing policy of the first customer-premises equipment comprises at least one service application, and a priority, a primary path, and a secondary path that are corresponding to each of the at least one service application; and wherein, responsive to executing the program, the processor is further configured to:
determine a service application whose priority is higher than a preset priority in the at least one service application, as a target application, wherein a primary path corresponding to the target application is a first path;
determine a path score of the first path; and
when the path score of the first path is less than a second threshold, change the primary path corresponding to the target application from the first path to any path whose path score is greater than a first threshold, to obtain a new routing policy of the first customer-premises equipment.

15. The routing apparatus of claim 13, wherein an original routing policy of the first customer-premises equipment comprises at least one service application, and a priority, a primary path, and a secondary path that are corresponding to each of the at least one service application; and wherein, responsive to executing the program, the processor is further configured to:
determine a service application whose priority is higher than a preset priority in the at least one service application, as a target application, wherein a primary path corresponding to the target application is a first path;
determine a path score of the first path; and
when the path score of the first path is less than a second threshold, change the primary path corresponding to the target application from the first path to any path whose path score is greater than a first threshold, to obtain a new routing policy of the first customer-premises equipment.

16. A routing apparatus, wherein the routing apparatus is a first customer-premises equipment and comprises:
a memory configured to store a program; and
a processor coupled to the memory and configured to execute the program, the processor further configured to, responsive to executing the program:
measure a plurality of distinct paths between the first customer-premises equipment and a second customer-premises equipment to obtain a path measurement result of each of the distinct paths;
generate a path measurement message carrying a path measurement result of each of the distinct paths, wherein the path measurement message is generated responsive to any path measurement result for any of the distinct paths meeting a preset condition
send the path measurement message to a controller;
receive a routing policy from the controller in response to the path measurement message; and
select a path for transmitting a data packet of each service application from the distinct paths according to the routing policy.

17. The routing apparatus of claim 16, wherein the path measurement result comprise at least one of path traffic, a path jitter rate, a path delay, a path packet loss rate, or path switching frequency.

18. The routing apparatus of claim 17, wherein, responsive to executing the program, the processor is further configured to:
receive a measurement notification message which comprises at least one of a traffic measurement threshold, a jitter measurement threshold, a delay measurement threshold, a packet loss measurement threshold, or a switching threshold; and
determine that the path measurement result meets the preset condition responsive to path traffic exceeding the traffic measurement threshold, a jitter rate exceeding the jitter measurement threshold, a delay exceeding the delay measurement threshold, a packet loss rate exceeding the packet loss measurement threshold, or switching frequency exceeding the switching threshold.

19. The routing method of claim 7, wherein measuring the plurality of distinct paths between the first customer-premises equipment and the second customer-premises equipment is responsive to receiving a measurement notification message from the controller, and wherein the measurement notification message comprises a traffic measurement threshold, a jitter measurement threshold, a delay measurement threshold, a packet loss measurement threshold, or a switching threshold.

20. The routing apparatus of claim 16, wherein the processor is further configured to measure the plurality of distinct paths between the first customer-premises equipment and the second customer-premises equipment responsive to receiving a measurement notification message from the controller, and wherein the measurement notification message comprises a traffic measurement threshold, a jitter measurement threshold, a delay measurement threshold, a packet loss measurement threshold, or a switching threshold.

* * * * *

UNITED STATES PATENT AND TRADEMARK OFFICE
CERTIFICATE OF CORRECTION

PATENT NO. : 11,362,951 B2
APPLICATION NO. : 16/508924
DATED : June 14, 2022
INVENTOR(S) : Ge Zhao It is certified that error appears in the above-identified patent and that said Letters Patent is hereby corrected as shown below:

In the Claims

Claim 9, Column 14, Line 66: "and/or or a switching" should read "or a switching"

Signed and Sealed this
Sixteenth Day of August, 2022

Katherine Kelly Vidal
*Director of the United States Patent and Trademark Office*